United States Patent
Wilson et al.

(10) Patent No.: US 7,897,545 B2
(45) Date of Patent: Mar. 1, 2011

(54) FLUID LOSS COMPOSITIONS AND METHODS OF USE FOR SUBTERRANEAN OPERATIONS

(75) Inventors: Steve F. Wilson, Loco, OK (US);
Jimmie D. Weaver, Duncan, OK (US);
Karen Savery, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 285 days.

(21) Appl. No.: 12/228,011

(22) Filed: Aug. 8, 2008

(65) Prior Publication Data

US 2010/0032160 A1    Feb. 11, 2010

(51) Int. Cl.
*C09K 8/60* (2006.01)
*B01F 3/12* (2006.01)

(52) U.S. Cl. ......... 507/219; 507/209; 507/211; 507/213; 507/214; 507/216; 507/271; 507/272; 507/273; 507/903; 507/904; 516/77; 516/902

(58) Field of Classification Search ................ 507/219, 507/209, 211, 213, 214, 215, 216, 271, 272, 507/273, 903, 904; 516/77, 902
See application file for complete search history.

(56) References Cited

U.S. PATENT DOCUMENTS

| 5,304,620 | A | | 4/1994 | Holtmyer et al. ............. 527/310 |
| 5,372,732 | A | * | 12/1994 | Harris et al. ................. 507/217 |
| 5,680,900 | A | | 10/1997 | Nguyen et al. |
| 6,342,467 | B1 | | 1/2002 | Chang et al. |
| 2003/0116317 | A1 | * | 6/2003 | Chang et al. ................. 166/270 |

FOREIGN PATENT DOCUMENTS

| EP | 0594364 A1 | 4/1994 |
| WO | WO01/96707 A1 | 12/2001 |

OTHER PUBLICATIONS

Halliburton brochure entitled "Enhancement, Hydraulic Fracturing and Acidizing", 2003.
Halliburton brochure entitled "K-Max-Plus™ Service for Improved Temporary Fluid Loss Control", 2005.
Halliburton brochure entitled "Sand Control, Max Seal® Fluid Loss Control Additive", 2006.
Halliburton brochure entitled "Sand Control Chemical Products and Services," pp. 11-1-11-34.
International Search Report and Written Opinion for PCT/GB2009/001963, dated Oct. 29, 2009.
Reel Reporter, SPE/IoTA Roundtable-Houston 2001, "Newsletter of the International Coiled Tubing Association," vol. 6, Issue 2.

* cited by examiner

*Primary Examiner* — Timothy J. Kugel
(74) *Attorney, Agent, or Firm* — Robert A. Kent; McDermott Will & Emery LLP

(57) ABSTRACT

Additives that may be useful in preventing fluid loss in certain subterranean formations and associated methods of use are provided. In one embodiment, the methods of the present invention comprise: providing a low molecular weight crosslinkable polymer and a crosslinking agent capable of crosslinking the low molecular weight crosslinkable polymer; and introducing the low molecular weight crosslinkable polymer and the crosslinking agent into at least a portion of a subterranean formation.

20 Claims, 1 Drawing Sheet

FLUID LOSS COMPOSITIONS AND METHODS OF USE FOR SUBTERRANEAN OPERATIONS

BACKGROUND

The present invention relates to subterranean treatments and operations, and more specifically, to additives that may be useful in preventing fluid loss in certain subterranean formations, and associated methods of use.

Providing effective fluid loss control for subterranean treatment fluids is highly desirable. "Fluid loss," as that term is used herein, refers to the undesirable migration or loss of fluids (such as the fluid portion of a drilling mud or cement slurry) into a subterranean formation and/or a proppant pack. The term "proppant pack," as used herein, refers to a collection of a mass of proppant particulates within a fracture or open space in a subterranean formation. These "treatment fluids" may comprise any fluids used in a subterranean application. As used herein, the term "treatment" does not imply any particular action by the fluid or any component thereof. Treatment fluids may be used in any number of subterranean operations, including drilling operations, fracturing operations, acidizing operations, gravel-packing operations, acidizing operations, well bore clean-out operations, and the like. Fluid loss may be problematic in any number of these operations. In fracturing treatments, for example, fluid loss into the formation may result in a reduction in fluid efficiency, such that the fracturing fluid cannot propagate the fracture as desired.

Fluid loss control materials are additives that lower the volume of a filtrate that passes through a filter medium. Certain particulate materials may be used as a fluid loss control materials in subterranean treatment fluids to fill the pore spaces in a formation matrix and/or proppant pack and/or to contact the surface of a formation face and/or proppant pack, thereby forming a filter cake that blocks the pore spaces in the formation or proppant pack, and prevents fluid loss therein. However, the use of certain particulate fluid loss control materials may be problematic. For instance, the sizes of the particulates may not be optimized for the pore spaces in a particular formation matrix and/or proppant pack and, as a result, may increase the risk of invasion of the particulate material into the interior of the formation matrix, which may greatly increase the difficulty of removal by subsequent remedial treatments. Additionally, once fluid loss control is no longer required, for example, after completing a treatment, remedial treatments may be required to remove the previously-placed fluid loss control materials, inter alia, so that a well may be placed into production. However, particulates that have become lodged in pore spaces and/or pore throats in the formation matrix and/or proppant pack may be difficult and/or costly to remove. Moreover, certain particulate fluid loss control materials may not be effective in low-permeability formations (e.g., formations with a permeability below about 1 milidarcy ("md")) since the leakoff rate in those formations is not high enough to pull the particulates into the pore spaces or into contact with the surface of the formation face and/or proppant pack so as to block or seal off the pore spaces therein.

Gelled fluids and fluid loss control "pills" comprising high-molecular weight polymers and/or crosslinked polymers have also been used to improve fluid loss control. "Crosslinked polymers" are polymers wherein two or more of the polymer molecules have become "crosslinked" by interaction with a "crosslinking agent," such as a metal ion or a borate ion. When included in a treatment fluid, these crosslinked or uncrosslinked polymeric materials may viscosify that fluid, thereby reducing the leakoff rate of the fluid into the formation and/or proppant pack. Crosslinked or uncrosslinked polymer molecules also may reduce fluid loss by filling the pore spaces of the formation matrix and/or proppant pack, thereby preventing the flow of fluid through those pore spaces.

In many subterranean operations, it is may be desirable to remove most or all of these fluid loss materials from the subterranean formation after use, among other purposes, to restore permeability of the formation for subsequent production of fluids out of the formation. Certain breakers have been used to break down polymeric fluid loss additives in subterranean formations. Where the fluid loss additive comprises a crosslinked polymer, the crosslinking interaction may be reversed (e.g., by contacting the crosslinked polymer with an acid or low-pH fluid that de-activates pH sensitive crosslinking agents) and the uncrosslinked polymeric material may be removed from the subterranean formation or permitted to leak off into the formation.

However, the use of conventional polymeric fluid loss additives also may be problematic. Specifically, it may be difficult to remove or break certain polymeric fluid loss additives to restore the formation to a high permeability. Certain polymers may require strong external breakers to break down the polymeric structure, which may be hazardous or expensive to use. In some cases, basic and/or high pH fluids may be present or introduced into the subterranean formation, for example, to displace the fluid loss additives and/or other substances in the formation. If sufficient amounts of the crosslinking agent and uncrosslinked polymeric fluid loss additive remain in the subterranean formation, the crosslinking agent may be re-activated and re-crosslink portions of the polymeric material. This may, among other things, reduce the permeability of the formation and hinder production of fluids from the formation.

SUMMARY

The present invention relates to subterranean treatments and operations, and more specifically, to additives that may be useful in preventing fluid loss in certain subterranean formations, and associated methods of use.

In one embodiment, the methods of the present invention comprise: providing a low molecular weight crosslinkable polymer and a crosslinking agent capable of crosslinking the low molecular weight crosslinkable polymer; introducing the low molecular weight crosslinkable polymer and the crosslinking agent into at least a portion of a subterranean formation; allowing the crosslinking agent to crosslink at least a portion of the low molecular weight crosslinkable polymer to form a gel that comprises the low molecular weight crosslinkable polymer and the crosslinking agent; and forming the gel into a plurality of particulates that comprise the low molecular weight crosslinkable polymer and the crosslinking agent.

In another embodiment, the methods of the present invention comprise: providing a solution comprising an aqueous base fluid and a low molecular weight crosslinkable polymer; adding a crosslinking agent capable of crosslinking the low molecular weight crosslinkable polymer to the solution; allowing the crosslinking agent to crosslink at least a portion of the low molecular weight crosslinkable polymer; shearing the solution to generate a fluid loss additive gel that comprises the low molecular weight crosslinkable polymer and the crosslinking agent; and forming the fluid loss additive gel into at least one fluid loss additive particulate.

In another embodiment, the methods of the present invention comprise: providing absolution comprising an aqueous base fluid and a low molecular weight crosslinkable polymer; adding a crosslinking agent capable of crosslinking the low molecular weight crosslinkable polymer to the solution; allowing the crosslinking agent to crosslink at least a portion of the low molecular weight crosslinkable polymer; shearing the solution to generate a fluid loss additive gel that comprises the low molecular weight crosslinkable polymer and the crosslinking agent; forming the fluid loss additive gel into at least one fluid loss additive particulate; and adding to the fluid loss additive gel an additional additive that is capable of facilitating the separation of water from the fluid loss additive particulate.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
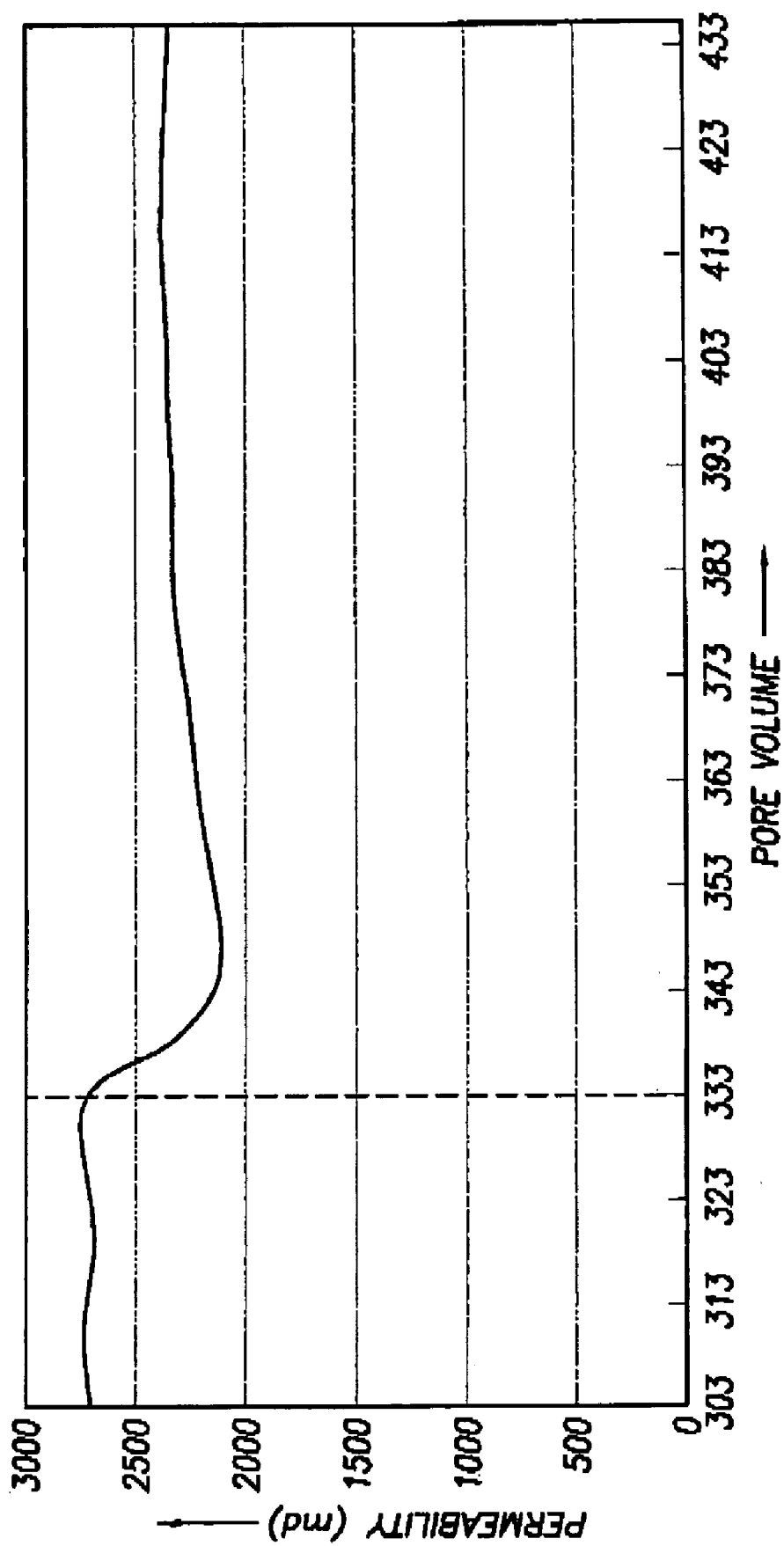
FIG. 1 is a plot of permeability data from a test of one embodiment of the present invention.

The present invention relates to subterranean treatments and operations, and more specifically, to additives that may be useful in preventing fluid loss in certain subterranean formations, and associated methods of use.

The treatment fluids and fluid loss additives of the present invention generally comprise a low molecular weight crosslinkable polymer and a crosslinking agent capable of crosslinking the low molecular weight crosslinkable polymer. The term "fluid loss additive" is defined herein to include any material that is capable of reducing the volume of a filtrate that passes through a filter medium (e.g., a matrix of particulates in a subterranean formation). The term "low molecular weight crosslinkable polymer" is defined herein to include any substance (e.g., an additive) whose molecules are (1) composed of several smaller repeating units that are covalently bonded together, (2) have a molecular weight of from about 50,000 to about 5,000,000 Daltons, and (3) are capable of interacting with a crosslinking agent to form a "crosslink" between multiple different polymer molecules or portions of a single polymer molecule. This term may include oligomers. The term "crosslinking agent" is defined herein to include any molecule, atom, or ion that is capable of forming one or more crosslinks between at least two molecules of the low molecular weight crosslinkable polymer and/or between one or more atoms in a single molecule of the low molecular weight crosslinkable polymer. The term "crosslink(s)" or "crosslinking" refers to a comparatively short connecting unit (as in a chemical bond or chemically bonded group), in relation to a monomer, oligomer, or polymer, between neighboring chains of atoms in one or more complex chemical molecule, e.g., a polymers.

Among the many advantages of the present invention, in certain embodiments, the fluid loss additives, treatment fluids, and methods of the present invention may reduce or prevent loss of fluid into a subterranean formation (for example, to less than about 10 barrels of fluid per hour). However, as compared with other fluid loss additives, treatment fluids, and methods known in the art, those of the present invention may provide, among other things, easier removal of the fluid loss additive from a subterranean formation and/or higher regain permeability in a subterranean formation once the fluid loss additive has been substantially removed from the subterranean formation. For example, in certain embodiments, the low molecular weight crosslinkable polymer may not "re-crosslink" or form a gel upon contact with fluids or components present in the subterranean formation (e.g., high pH fluids), which may permit easier and/or more complete removal of the fluid loss additive from the subterranean formation. In certain embodiments, the fluid loss additives of the present invention may be removed from a subterranean formation without the need for additional breakers or other additives. Moreover, in certain embodiments, the present invention may provide pre-mixed fluid loss additives and/or treatment fluids that require little or no additional processing prior to use. The fluid loss additives of the present invention also may be stable at higher temperatures over a longer period of time than certain other fluid loss additives known in the art. For example, in certain embodiments, the fluid loss additives of the present invention may be stable at about 200° F. for about five days.

Additionally, certain uses and conditions of use may make it desirable to control or optimize certain properties of the treatment fluids and/or fluid loss additives of the present invention. For example, in certain embodiments, fluid loss additives of a particular size distribution may provide more effective fluid loss prevention in a subterranean formation due to, among other things, the porosity of a subterranean formation. In certain embodiments, it may be desirable to have fluid loss additives of a particular density based on, among other things, the density of the fluid used, to introduce those fluid loss additives into a subterranean formation. In other embodiments, it may be desirable to have fluid loss additives that are stable at certain temperatures over a certain period of time. In certain embodiments, the present invention may provide the ability to control and/or optimize the size, temperature stability, density, texture, brittleness, and/or other properties of the fluid loss additives of the present invention for use in a particular subterranean formation. This may be accomplished, among other ways, by varying certain conditions and parameters during their preparation and/or selecting certain components of the fluid loss additives (e.g., fluids, low molecular weight crosslinkable polymers, crosslinking agents, etc.) that provide the properties desired for use in a particular subterranean formation.

The low molecular weight crosslinkable polymers used in the present invention may comprise any substance (e.g., an additive) whose molecules are (1) composed of several smaller repeating units that are covalently bonded together, (2) have a molecular weight of from about 50,000 to about 5,000,000 Daltons, and (3) are capable of interacting with a crosslinking agent to form a "crosslink" between at least two different polymer molecules or at least two atoms in a single polymer molecule. This term may include oligomers. In certain embodiments, the low molecular weight crosslinkable polymer may have a molecular weight of from about 100,000 to about 750,000 Daltons. In certain embodiments, the low molecular weight crosslinkable polymer may have a molecular weight of from about 50,000 to about 1,000,000 Daltons. The low molecular weight crosslinkable polymer may be naturally-occurring or synthetic. The low molecular weight crosslinkable polymer may be made by depolymerizing any polymeric material known in the art, which may comprise naturally-occuring and/or synthetic materials. Examples of polymeric materials that may be used to make low molecular weight crosslinkable polymers that may be suitable for use in the present invention include, but are not limited to polysaccharides, and derivatives thereof that contain one or more of these monosaccharide units: galactose, mannose, glucoside, glucose, xylose, arabinose, fructose, glucuronic acid, or pyranosyl sulfate. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), and combinations thereof. In certain embodiments, the gelling agents comprise an organic carboxylated polymer, such as CMHPG. In certain embodiments, the derivatized cellulose is a cellulose grafted with an allyl or a vinyl monomer, such as those disclosed in U.S. Pat. Nos. 4,982,793, 5,067,565, and 5,122,549, the entire disclosures of which are incorporated herein by reference. Examples of suitable synthetic polymers include, but are not limited to, 2,2'-azobis(2,4-dimethyl valeronitrile), 2,2'-azobis(2,4-dimethyl-4-methoxy valeronitrile), polymers and copolymers of acrylamide ethyltrimethyl ammonium chloride, acrylamide, acrylamido- and methacrylamido-alkyl trialkyl ammonium salts, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethylaminopropylmethacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octylammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacrylate, partially hydrolyzed polyacrylamide, poly 2-amino-2-methyl propane sulfonic acid, polyvinyl alcohol, sodium 2-acrylamido-2-methylpropane sulfonate, quaternized dimethylaminoethylacrylate, quaternized dimethylaminoethylmethacrylate, and mixtures and derivatives thereof. In certain embodiments, the polymers may comprise an acrylamide/2-(methacryloyloxy)ethyltrimethylammonium methyl sulfate copolymer. In certain embodiments, the polymers may comprise an acrylamide/2-(methacryloyloxy)ethyltrimethylammonium chloride copolymer. Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used.

One or more of any of the polymeric materials described above may be depolymerized to form the low molecular weight crosslinkable polymers used in the present invention. The term "depolymerized," as used herein, generally refers to a decrease in the molecular weight of the gelling agent molecule. This may be accomplished by any means or process known in the art for depolymerizing polymeric materials, such as thermal depolymerization, chemical depolymerization, hydrolysis, and irradiation. Low molecular weight crosslinkable polymers also may be available in a form that requires little or no additional processing prior to use. For example, Halliburton MICROPOLYMER™ (available from Halliburton Energy Services, Duncan, Okla.) is an example of a commercially-available source of low-molecular weight crosslinkable polymer. Certain low molecular weight crosslinkable polymers may yield fluid loss additive particles having certain properties (e.g., textures, density, temperature stability, etc.) that may be desirable for certain uses. A person of ordinary skill in the art, with the benefit of this disclosure, will be able to determine and select low molecular weight crosslinkable polymers appropriate for a particular application of the present invention based on, among other things, the properties of the fluid loss additive desired in a particular application.

The low molecular weight crosslinkable polymer may be present in any amount that is sufficient to provide the desired amount of fluid loss control or to produce the desired amount of fluid loss additives of the present invention for a particular use. Being just above the critical overlap concentration $C^*$. Moreover, the amount of the low molecular weight crosslinkable polymer may depend on, among other things, the molecular weight of the low molecular weight crosslinkable polymer and the desired texture of the fluid loss additive particles to be made. Where the low molecular weight crosslinkable polymer is present in a treatment fluid used to introduce the low molecular weight crosslinkable polymer or fluid loss additive into a subterranean formation, in certain embodiments, the low molecular weight crosslinkable polymer may be present in an amount of from about 200 pounds per thousand gallons of fluid ("pptg") to about 1000 pptg. In certain embodiments, the low molecular weight crosslinkable polymer may be present in an amount of from about 300 pptg to about 600 pptg. In certain embodiments, the low molecular weight crosslinkable polymer may be present in an amount of from about 500 pptg to about 600 pptg. A person of ordinary skill in the art, with the benefit of this disclosure, will be able to determine and select an appropriate amount of the low molecular weight crosslinkable polymer to be used in a particular application based on, among other things, the particular type of low molecular weight crosslinkable polymer used, the desired amount of fluid loss additive needed and/or the desired texture of the fluid loss additives particles in a particular application. For example, in certain embodiments, it may be desirable to use a higher concentration of a low molecular weight crosslinkable polymer having a lower molecular weight, as compared to the concentration that may be used with a low molecular weight crosslinkable polymer having a higher molecular weight.

The crosslinking agents used in the present invention may comprise any any molecule, atom, or ion that is capable of forming one or more crosslinks between at least two molecules of the low molecular weight crosslinkable polymer and/or between one or more atoms in a single molecule of the low molecular weight crosslinkable polymer. The crosslinking agents used in the present invention may comprise any crosslinking agent known in the art. Examples of suitable crosslinking agents include, but are not limited to, borate ions, zirconium IV ions, titanium IV ions, aluminum ions, antimony ions, chromium ions, iron ions, copper ions, and zinc ions. These ions may be provided by providing any compound that is capable of producing one or more of these ions; examples of such compounds include, but are not limited to, boric acid, disodium octaborate tetrahydrate, sodium diborate, pentaborates, ulexite, colemanite, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, and titanium acetylacetonate, aluminum lactate, aluminum citrate, antimony compounds, chromium compounds, iron compounds, copper compounds, zinc compounds add organoborates (Weaver/Slabaugh/Hanes applications) Examples of commercially-available crosslinking agents that may be suitable for use in the present invention are those sold under the tradenames: HMP Link™, BC-140™, BC-200™, CL-11™, CL-18™, CL-19™, CL-20™, CL-21™, CL-22™, CL-23™, CL-24™, CL-26™, CL-27™, CL-28™, CL-28™, CL-29™, CL-30™, CL-31™, CL-36™, K-38™, XL-1™, and TB-41™ (all available from Halliburton Energy Services, Duncan, Okla.). The particular crosslinking agent used may depend on, among other things, characteristics of the fluids (e.g., pH) to be used in the subterranean formation, the type and/or amount of the low molecular weight crosslinkable polymer used, and/or the temperature in the subterranean formation where the crosslinking agent is to be used. A person of ordinary skill in the art, with the benefit of this disclosure, will be able to select a crosslinking agent (and a form in which to provide it) that is suitable for a particular application of the present invention based on these and/or other factors.

In certain embodiments, the crosslinking agents used in the present invention may be activated or de-activated by altering the conditions (e.g., pH, temperature, etc.) in which they are used or exposing them to some other activating or de-activating agent. For example, in certain embodiments, the crosslinking agent may be provided in a form that allows for a delayed release of the crosslinking agent. A delayed release may be desirable, inter alia, when a subterranean operation involves high temperature conditions, and release of the crosslinking agent is desired after these high temperature conditions are encountered. A delayed release also may be desirable in a deep well or in a well requiring a long pump time. In certain embodiments, the crosslinking agents used in the present invention (or the materials comprising those crosslinking agents) may be encapsulated or enclosed within an outer coating that is capable of degrading at a desired time. Exemplary encapsulation methodologies are described in U.S. Pat. Nos. 5,373,901; 6,444,316; 6,527,051; and 6,554,071, the entire disclosures of which are incorporated herein by reference. In certain embodiments, suitable coating or enclosing materials may comprise degradable materials in which the products of the degradation do not adversely affect the crosslinking agents used. The terms "degradation" or "degradable" refer to both the two relatively extreme cases of hydrolytic degradation that the degradable material may undergo, i.e., heterogeneous (or bulk erosion) and homogeneous (or surface erosion), and any stage of degradation in between these two. Examples of degradable materials that may be used as a coating or enclosing means in conjunction with the crosslinking agents used in the present invention include, but are not limited to, polysaccharides, such as dextran or cellulose; chitins; chitosans; proteins; aliphatic polyesters; poly(lactides); poly(glycolides); poly($\epsilon$-caprolactones); poly(hydroxybutyrates); poly(anhydrides); aliphatic polycarbonates; ortho esters; poly(orthoesters); poly(amino acids); poly(ethylene oxides); and poly(phosphazenes). Other suitable degradable polymers include heat-sealable materials, other thermoplastic materials, or materials that may be dissolved with an appropriate solvent (e.g., hydroxypropylmethylcellulose, pectin, polyethylene oxide, polyvinyl alcohol, alginate, polycaprolactone, gelatinised starch-based materials, and the like). A person of ordinary skill in the art, with the benefit of this disclosure, will recognize the appropriate encapsulated crosslinking agents to use in a particular application of the present invention, where desired.

In certain embodiments, the crosslinking agent may be present in any amount sufficient to provide the desired amount of crosslinking between the molecules of the low molecular weight crosslinkable polymer. Where the crosslinking agent is present in a treatment fluid used to introduce the crosslinking agent or fluid loss additive into a subterranean formation, in certain embodiments, the crosslinking agent may be present in the treatment fluids in an amount in the range of from about 0.01% to about 20% by weight of the low molecular weight crosslinkable polymer. In certain embodiments, the crosslinking agent may be present in the treatment fluid in an amount of about 1.5% by weight of the low molecular weight crosslinkable polymer. In certain embodiments, the crosslinking agent may be present in an amount of about 15 gallons per thousand gallons of the fluid. A person of ordinary skill in the art, with the benefit of this disclosure, will be able to determine and select an appropriate amount of the crosslinking agent to be used in a particular application based on, among other things, the type of crosslinking agent used, the low molecular weight crosslinkable polymer used, the desired amount of fluid loss additive needed and/or the desired texture of the fluid loss additives particles in a particular application. For example, in certain embodiments, increasing the concentration of the crosslinking agent may, among other things, may increase the brittleness and/or the stability at high temperatures of the fluid loss additive produced.

The fluid loss additives and treatment fluids of the present invention (and any components thereof) may be provided in any form known in the art for these substances. In certain embodiments, the fluid loss additives and/or treatment fluids of the present invention may comprise a gel and/or plurality of particulates that comprise the low molecular weight crosslinkable polymer that has been at least partially crosslinked by the crosslinking agent, which are referred to herein as a "fluid loss additive gel" or "fluid loss additive particulates" of the present invention, respectively. The term "gel" as used herein refers to a semi-solid, jelly-like state. The term "particulate" as used herein may refer to any solid mass, and does not require that it have any particular size, shape, texture, brittleness, and/or hardness.

In certain embodiments, the fluid loss additive gels and/or particulates of the present invention may be provided in a mixture with a brine (e.g., a brine in which the fluid loss additive gels and/or particulates were generated) or some other fluid to be introduced into a subterranean formation, for example, as a treatment fluid of the present invention. In other embodiments, the fluid loss additive gels and/or particulates of the present invention may be provided in a suspension wherein a fluid (e.g., an aqueous fluid, a nonaqueous fluid, a gas, etc.) or some other material suspends the fluid loss additive gels and/or particulates of the present invention. In certain embodiments, this fluid may comprise a highly shear thinning polymer solution (e.g., a xanthan solution), an organophilic clay solution, a silica solution, or some other fluid that is capable of suspending the fluid loss additive particulates. In some embodiments, it may be desirable that the solution not contain a substantial amount of any substance that would crosslink the low molecular weight crosslinkable polymer. A treatment fluid and/or fluid loss additive of the present invention provided as such a suspension may have certain properties that, among other benefits, permit storage of the suspension for some period of time prior to use and/or may facilitate the process of mixing the suspension into a brine or other treatment fluid for use in a subterranean formation.

In certain embodiments, the low molecular weight crosslinkable polymer may be provided as a dry powdered substance that is added to an aqueous fluid for hydration. Alternatively, the low molecular weight crosslinkable polymer that is already at least partially crosslinked by a crosslinking agent may be provided as a dry powdered substance that is then added to an aqueous fluid for hydration. These substances may be circulated downhole in a subterranean formation and allowed to form fluid loss additive gels and/or particulates of the present invention.

The treatment fluids of the present invention generally comprise a base fluid, a low molecular weight crosslinkable polymer, and a crosslinking agent capable of crosslinking the low molecular weight crosslinkable polymer.

The base fluid may comprise any fluid(s) that does not adversely interact with the other components used in accordance with this invention. For example, the base fluid may comprise an aqueous fluid, a non-aqueous fluid (e.g., mineral oils, synthetic oils, esters, etc.), a hydrocarbon-based fluid (e.g., kerosene, xylene, toluene, diesel, oils, etc.), a gas, a foamed fluid (e.g., a liquid that further comprises a gas), and/or an emulsion. Aqueous base fluids that may be suitable for use in the present invention may comprise fresh water, saltwater (e.g., water containing one or more salts dissolved therein), brine, or seawater. Generally, the water may be from any source, provided that it does not contain components that might adversely affect the stability and/or performance of the fluid loss additives and/or methods of the present invention. For example, in certain embodiments, the aqueous base fluid may comprise water that has been produced from a subterranean formation (referred to herein as "produced water"). In certain embodiments, the density of an aqueous base fluid can be adjusted, among other purposes, to provide a more even distribution of the fluid loss additives and/or other components in the treatment fluid of the present invention. In certain embodiments, the pH of the aqueous base fluid may be adjusted (e.g., by a buffer or other pH adjusting agent), among other purposes, to activate one or more crosslinking agents or breakers present therein. In these embodiments, the pH may be adjusted to a specific level, which may depend on, among other factors, the types of crosslinking agents and/or breakers in the treatment fluid or in the subterranean formation. One of ordinary skill in the art, with the benefit of this disclosure, will recognize when such density and/or pH adjustments are appropriate.

The treatment fluids of the present invention optionally may comprise one or more of any additional additives known in the art. Examples of such additional additives include, but are not limited to, soaps, co-surfactants, carboxylic acids, acids, bases, additional fluid loss control additives, gas, foamers, corrosion inhibitors, scale inhibitors, catalysts, clay control agents, iron control agents, pH control additives (e.g., buffers), breakers, biocides, friction reducers, antifoam agents, bridging agents, dispersants, flocculants, $H_2S$ scavengers, $CO_2$ scavengers, oxygen scavengers, lubricants, viscosifiers, weighting agents, relative permeability modifiers, resins, wetting agents, coating enhancement agents, and the like. A person skilled in the art, with the benefit of this disclosure, will recognize the types of additives that may be included in the linear gelled fluids for a particular application.

The fluid loss additives and/or treatment fluids of the present invention and/or any component thereof may be prepared at a job site, or they may be prepared at a plant or facility prior to use, and may be stored for some period of time prior to use. In certain embodiments, the preparation of these fluid loss additives and/or treatment fluids of the present invention may be done at the job site in a method characterized as being performed "on the fly." The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. These streams also may be held for a period of time, among other purposes, to facilitate polymer hydration prior to injection.

In certain embodiments, the methods of the present invention comprise a method of making a fluid loss additive and/or a treatment fluid of the present invention. These methods of the present invention generally comprise: providing a solution comprising an aqueous base fluid and a low molecular weight crosslinkable polymer; adding a crosslinking agent capable of crosslinking the low molecular weight crosslinkable polymer to the solution; allowing the crosslinking agent to crosslink at least a portion of the low molecular weight crosslinkable polymer; shearing the solution to generate a fluid loss additive gel that comprises the low molecular weight crosslinkable polymer and the crosslinking agent; and forming the fluid loss additive gel into a plurality of fluid loss additive particulates of the present invention.

Various properties of the fluid loss additive gels and/or particulates generated by these methods of the present invention may be altered by varying certain conditions and parameters of those methods. For example, the size of the fluid loss additive particulates generated by these methods of the present invention may be controlled, among other ways, by varying the time and intensity with which the solution is sheared to generate the fluid loss additive gel. The size of the fluid loss additive particulates also may be determined by the apparatus used to form them, for example, the size of the orifices in a plate through which the fluid loss additive gel is forced to form the particulates. Controlling the size of the fluid loss additive particulates may, among other benefits, permit the manufacture of a fluid loss additive particulate that is optimized for use in a subterranean formation of a particular porosity. Moreover, performing the steps recited above in one order may produce fluid loss additive particulates having different properties from those formed with the same steps in a different order.

In certain embodiments, additional steps may be performed in the course of the methods of making a fluid loss additive and/or a treatment fluid of the present invention described above. For example, in certain embodiments, these methods of the present invention may further comprise activating the crosslinking agent prior to allowing the crosslinking agent to crosslink at least a portion of the low molecular weight crosslinkable polymer. For example, certain crosslinking agents may be activated by increasing the pH of the solution in which it is found by any means known in the art, such as addition of a caustic. In certain embodiments, these methods of the present invention may further comprise adding an additional additive that, among other things, promotes further crosslinking of the low molecular weight crosslinkable polymer, increases rate, prevents particulates from sticking together, and/or facilitates the separation or extraction of water from the fluid loss additive gels and/or particulates of the present invention. For example, this additive may form a film around the particulates to allow water to separate from the particulate. Such additional additives may be added to the solution, the fluid loss additive gel, and/or the plurality of fluid loss additive particulates of the present invention at any point during the methods described above. This additional additive may comprise a mutual solvent, such as polyethylene glycol, propylene carbonate, and other solvents. The addition of the additional additive may, among other things, cause the fluid loss additive gels and/or particulates of the present invention to shrink in volume.

In certain embodiments, these methods of the present invention may further comprise additional steps, inter alia, to further prepare the fluid loss additives of the present invention for use in a subterranean formation. For example, these methods of the present invention may further comprise combining a fluid loss additive gel or the fluid loss additive particulate(s) of the present invention with an additional fluid (e.g., an aqueous fluid, a nonaqueous fluid, a gas, etc.), among other purposes, to suspend the fluid loss additive gel or fluid loss additive particulates generated. In certain embodiments, this fluid may comprise a highly shear thinning polymer solution (e.g., a xanthan solution), an organophilic clay solution, or some other solution that is capable of suspending the fluid loss additive particulates. In some embodiments, it may be desirable that the solution not contain a substantial amount of any substance that would crosslink the low molecular weight crosslinkable polymer. In other embodiments, the fluid loss additive gel or fluid loss additive particulate(s) of the present invention may be combined with a brine or some other treatment fluid to be introduced into a subterranean formation to form a treatment fluid of the present invention. A person of ordinary skill in the art, with the benefit of this disclosure, will recognize when an additional fluid should be combined with the fluid loss additive gel or fluid loss additive particulate(s), as well as the appropriate type and amount of an additional fluid to be used.

In certain embodiments, the methods of the present invention comprise: providing a low molecular weight crosslinkable polymer and a crosslinking agent capable of crosslinking the low molecular weight crosslinkable polymer; and introducing the low molecular weight crosslinkable polymer and the crosslinking agent into at least a portion of a subterranean formation. The low molecular weight crosslinkable polymer and the crosslinking agent capable of crosslinking the low molecular weight crosslinkable polymer may be provided separately, or they may be provided in a form where they are already at least partially combined, for example, as a fluid loss additive of the present invention. In certain embodiments, one or more of the low molecular weight crosslinkable polymer and the crosslinking agents may be provided in a treatment fluid. For example, the low molecular weight crosslinkable polymer and the crosslinkable polymer may be provided in a treatment fluid of the present invention. In these methods of the present invention, the low molecular weight crosslinkable polymer and the crosslinking agent may be introduced into at least a portion of a subterranean formation by any means known in the art. For example, the low molecular weight crosslinkable polymer and/or the crosslinking agent may be introduced into a well bore that penetrates the portion of the subterranean formation. In certain embodiments, the low molecular weight crosslinkable polymer and/or the crosslinking agent may be introduced into at least a portion of a subterranean formation as a component of a treatment fluid, for example, a treatment fluid of the present invention that comprises the low molecular weight crosslinkable polymer and the crosslinking agent. In certain embodiments, the low molecular weight crosslinkable polymer and the crosslinking agent may be introduced into the subterranean formation as a fluid loss additive gel or at least one fluid loss additive particulate of the present invention. In other embodiments, the low molecular weight crosslinkable polymer and the crosslinking agent may be introduced into at least a portion of a subterranean formation such that they subsequently form a fluid loss additive gel or at least one fluid loss additive particulate of the present invention.

These methods of the present invention may be used prior to, during, or subsequent to a variety of subterranean operations known in the art. Examples of such operations include, but are not limited to drilling operations, pre-pad treatments, fracturing operations, perforation operations, preflush treatments, afterflush treatments, sand control treatments (e.g., gravel packing), acidizing treatments (e.g., matrix acidizing or fracture acidizing), "frac-pack" treatments, cementing treatments, and well bore clean-out treatments. For example, certain embodiments of the present invention may comprise introducing a treatment fluid (e.g., a treatment fluid of the present invention) into a portion of a subterranean formation at or above a pressure sufficient to create or enhance one or more fractures in the subterranean formation. "Enhancing" one or more fractures in a subterranean formation may include the extension or enlargement of one or more natural or previously-created fractures in the subterranean formation.

In certain embodiments, the methods of the present invention optionally may comprise removing at least a portion of the low molecular weight crosslinkable polymer from at least a portion of a subterranean formation. This may be accomplished by any means known in the art. For example, the low molecular weight crosslinkable polymer may be contacted with an additive or fluid that reverses or "inactivates" the crosslinking agent (e.g., an acid or fluid having a pH below about 8), thereby permitting the low molecular weight crosslinkable polymer to be flowed out of the portion of the subterranean formation. In certain of these embodiments, the additive may comprise a delayed-release acid additive (e.g., polylactic acid) that is introduced into the portion of the subterranean formation at some time prior to the step of removing at least a portion of the low molecular weight crosslinkable polymer from at least a portion of a subterranean formation, and subsequently releases an acid that reverses or "inactivates" the crosslinking agent. In certain embodiments, at least a portion of the low molecular weight crosslinkable polymer may be removed from at least a portion of a subterranean formation by diluting the concentration of the low molecular weight crosslinkable polymer below the minimum concentration required for that polymer to form a stable gel, thereby permitting the low molecular weight crosslinkable polymer to be flowed out of the portion of the subterranean formation.

To facilitate a better understanding of the present invention, the following examples of certain aspects of some embodiments are given. In no way should the following examples be read to limit, or define, the entire scope of the invention.

EXAMPLES

Example 1

A fluid loss additive of the present invention was prepared in the laboratory by blending Halliburton MicroPolymer (a depolymerized guar gum derivative available from Halliburton Energy Services, Duncan, Okla.) in a potassium chloride brine (density=9 pounds per gallon) to have a concentration of approximately 300 pptg and a volume of about 250 mL. The pH of the mixture was raised to about 11 by adding sodium hydroxide. CL-28™ (a crosslinker available from Halliburton Energy Services, Inc.) was added to the solution to crosslink the polymer and to form a gel. The gel was sheared briefly to break the gel into smaller pieces. To that gel was added 30 mL of polyethylene glycol, and the gel was allowed to set static for about 1 hour. After the rest period, high shear was applied to the gel in a Waring blender until the desired particulate size was obtained. The particulates were then suspended in a 40 pptg AquaLinear™ (a food grade xanthan available from CP Kelco) gel.

The fluid loss additive particulates were first tested for their fluid loss prevention properties. This suspension was mixed with a 9.1 ppg potassium chloride brine to make a solution have a 20% concentration of the sheared particulates. The resulting suspension was then screened for fluid loss control using a high pressure high temperature (HPHT) cell using a 20 micron (~2.8 Darcy) Aloxite disk. Testing was conducted at 200° F. and 300 psi for 30 minutes. A total of 7 mL filtrate leaked through the disk during the first 10 minutes, and a good filtercake formed on the disk.

The fluid loss additive particulates were then used to run regain permeability tests using a Brown Sandstone core (core length=4.38 cm; core diameter=2.51 cm) in a Hassler sleeve. FIG. 1 illustrates the data from this test, plotting the permeability of the core over the course of the testing. A 9.13 ppg potassium chloride brine was injected into the core in the injection direction at a rate of 30 mL/min to establish the initial permeability (as shown on the left side of the vertical dashed line in FIG. 1). The core was then shut in at 200° F. and 1000 psi differential for 48 hours. Then, a 5% hydrochloric acid solution was injected into the core through the injection direction. The regain permeability was measured by injecting a 9.13 ppg potassium chloride brine through the core in the production direction at a rate of 30 mL/min to determine the regain permeability (as shown on the right side of the vertical dashed line in FIG. 1). Regain permeability of about 87% was achieved.

Example 2

Another fluid loss additive of the present invention was prepared by loading 250 gallons of a low molecular weight HPG linear gel into a reactor and raising the pH of the gel to about 11 by adding about 250 mL sodium hydroxide. The gel was stirred and 7.5 pounds magnesium oxide (30 pptg slurried in a 9.1 ppg potassium chloride brine) was added. At the maximum stirring rate, 3.75 gallons of CL-28™ crosslinker was added, and the gel was stirred until fully crosslinked (about 1 hour). 25 gallons of a 9.1 ppg potassium chloride brine was added to the crosslinked gel, and air was blown from the bottom of the reactor up through the crosslinked gel to break it up. The crosslinked gel was then pumped into a 300-gallon tote while passing through an orifice plate having approximately thirty holes measuring approximately ⅜ inches.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by any amount (e.g., 1 percent, 2 percent, 5 percent, or, sometimes, 10 to 20 percent). Whenever a numerical range, R, with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. A method comprising:
   providing a low molecular weight crosslinkable polymer and a crosslinking agent;
   introducing the low molecular weight crosslinkable polymer and the crosslinking agent into at least a portion of a subterranean formation;
   allowing the crosslinking agent to crosslink at least a portion of the low molecular weight crosslinkable polymer to form a gel that comprises the low molecular weight crosslinkable polymer and the crosslinking agent;
   providing a mutual solvent capable of facilitating the separation of water from the fluid loss additive particulate; and
   forming the gel into a plurality of particulates.

2. The method of claim 1 wherein:
   providing a low molecular weight crosslinkable polymer and a crosslinking agent capable of crosslinking the low molecular weight crosslinkable polymer comprises providing a treatment fluid that comprises a base fluid, the low molecular weight crosslinkable polymer, and the crosslinking agent; and
   introducing the low molecular weight crosslinkable polymer and the crosslinking agent into the portion of the subterranean formation comprises introducing the treatment fluid into at least a portion of the subterranean formation.

3. The method of claim 2 wherein the base fluid comprises at least one brine.

4. The method of claim 2 wherein the low molecular weight crosslinkable polymer is present in the treatment fluid in an amount of from about 300 pounds to about 600 pounds per thousand gallons of treatment fluid.

5. The method of claim 1 wherein providing a low molecular weight crosslinkable polymer and a crosslinking agent capable of crosslinking the low molecular weight crosslinkable polymer comprises providing at least one fluid loss additive particulate comprising the low molecular weight crosslinkable polymer and the crosslinking agent.

6. The method of claim 5 wherein the at least one fluid loss additive particulate is present in a suspension that further comprises at least one fluid that is capable of suspending the fluid loss additive particulate.

7. The method of claim 1 wherein the low molecular weight crosslinkable polymer has a molecular weight of about 50,000 Daltons to about 1,000,000 Daltons.

8. The method of claim 1 wherein the low molecular weight crosslinkable polymer has a molecular weight of about 100,000 Daltons to about 750,000 Daltons.

9. The method of claim 1 wherein the mutual solvent is selected from the group consisting of polyethylene glycol, propylene carbonate, and combinations thereof.

10. The method of claim 1 further comprising removing at least a portion of the low molecular weight crosslinkable polymer from at least a portion of the subterranean formation.

11. A method comprising:
providing a solution comprising an aqueous base fluid and a low molecular weight crosslinkable polymer and a crosslinking agent;
allowing the crosslinking agent to crosslink at least a portion of the low molecular weight crosslinkable polymer;
shearing the solution to generate a fluid loss additive gel that comprises the low molecular weight crosslinkable polymer and the crosslinking agent;
forming the fluid loss additive gel into at least one fluid loss additive particulate; and,
providing a mutual solvent capable of facilitating the separation of water from the fluid loss additive particulate.

12. A fluid loss additive particulate made by the method of claim 11.

13. The method of claim 11 further comprising adjusting the pH of the solution.

14. The method of claim 11 wherein the low molecular weight crosslinkable polymer has a molecular weight of about 50,000 Daltons to about 1,000,000 Daltons.

15. The method of claim 11 further comprising introducing the fluid loss additive particulate into at least a portion of a subterranean formation.

16. The method of claim 11 wherein the mutual solvent is selected from the group consisting of polyethylene glycol, propylene carbonate, and combinations thereof.

17. A method comprising:
providing a treatment fluid the comprises a base fluid, a low molecular weight crosslinkable polymer and a crosslinking agent capable of crosslinking the low molecular weight crosslinkable polymer;
wherein the low molecular weight crosslinkable polymer is present in the treatment fluid in an amount of from about 300 pounds to about 600 pounds per thousand gallons of treatment fluid;
allowing the crosslinking agent to crosslink at least a portion of the low molecular weight crosslinkable polymer to form a gel that comprises the low molecular weight crosslinkable polymer and the crosslinking agent;
forming the gel into a plurality of particulates that comprise the low molecular weight crosslinkable polymer and the crosslinking agent; and,
introducing the treatment fluid comprising plurality of particulates into at least a portion of a subterranean formation.

18. The method of claim 17 further comprising adding to the treatment fluid an additional additive that is capable of facilitating the separation of water from the fluid loss additive particulate.

19. The method of claim 17 wherein the mutual solvent is selected from the group consisting of polyethylene glycol, propylene carbonate, and combinations thereof.

20. The method of claim 17 wherein the low molecular weight crosslinkable polymer has a molecular weight of about 50,000 Daltons to about 1,000,000 Daltons.

* * * * *